(12) United States Patent
Branson et al.

(10) Patent No.: US 8,843,524 B2
(45) Date of Patent: Sep. 23, 2014

(54) HANDLING OUT-OF-SEQUENCE DATA IN A STREAMING ENVIRONMENT

(71) Applicant: International Business Machines Corporation, Armonk, NY (US)

(72) Inventors: Michael J. Branson, Rochester, MN (US); Ryan K. Cradick, Oronoco, MN (US); John M. Santosuosso, Rochester, MN (US); Brandon W. Schulz, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 50 days.

(21) Appl. No.: 13/626,122

(22) Filed: Sep. 25, 2012

(65) Prior Publication Data

US 2014/0089351 A1   Mar. 27, 2014

(51) Int. Cl.
*G06F 17/30* (2006.01)
(52) U.S. Cl.
USPC ........... 707/791; 707/608; 707/687; 707/802; 707/828

(58) Field of Classification Search
USPC .......................... 707/687, 608, 791, 802, 828
See application file for complete search history.

(56) References Cited

U.S. PATENT DOCUMENTS

| | | |
|---|---|---|
| 2006/0143170 A1 | 6/2006 | Ganguly et al. |
| 2007/0214111 A1* | 9/2007 | Jin et al. ............................ 707/3 |
| 2008/0275891 A1 | 11/2008 | Park et al. |
| 2009/0271529 A1 | 10/2009 | Kashiyama et al. |
| 2009/0319687 A1 | 12/2009 | Goldstein et al. |
| 2010/0223606 A1 | 9/2010 | Park et al. |

* cited by examiner

*Primary Examiner* — Sana Al Hashemi
(74) *Attorney, Agent, or Firm* — Patterson & Sheridan LLP

(57) ABSTRACT

Computer-implemented method, system, and computer program product for processing data in an out-of-order manner in a streams computing environment. A windowing condition is defined such that incoming data tuples are processed within a specified time or count of each other. Additionally, the windowing condition may be based on a specified attribute of the data tuples. If the tuples are not processed within the constraints specified by the windowing condition, the unprocessed tuples may be discarded, i.e., not processed, to optimize operator performance.

13 Claims, 7 Drawing Sheets

HANDLING OUT-OF-SEQUENCE DATA IN A STREAMING ENVIRONMENT

BACKGROUND

While computer databases have become extremely sophisticated, the computing demands placed on database systems have also increased at a rapid pace. Database systems are typically configured to separate the process of storing data from accessing, manipulating or using data stored in the database. More specifically, databases use a model where data is first stored, then indexed, and finally queried. However, this model cannot meet the performance requirements of some real-time applications. For example, the rate at which a database system can receive and store incoming data limits how much data can be processed or otherwise evaluated. This, in turn, can limit the ability of database applications to process large amounts of data in real-time.

SUMMARY

Embodiments disclosed herein provide a computer-implemented method, system, and computer program product to perform an operation, the operation beginning by providing multiple processing elements including one or more operators, the operators configured to process streaming data tuples. The operation then establishes an operator graph of multiple operators, the operator graph defining at least one execution path in which a first operator is configured to receive data tuples from at least one upstream operator and transmit data tuples to at least one downstream operator. The operation then defines a windowing condition specifying at least one rule for processing data tuples. The operation then, responsive to receiving, at a first operator, an indication to enforce the windowing condition on the first operator, processes a first set of data tuples received by the first operator. The operation, while processing the first set of data tuples and upon determining that the windowing condition has been satisfied, ceases processing the first set of data tuples, where at least one data tuple is not processed, and proceeds to process a second set of data tuples.

BRIEF DESCRIPTION OF THE SEVERAL VIEWS OF THE DRAWINGS

So that the manner in which the above recited aspects are attained and can be understood in detail, a more particular description of embodiments of the disclosure, briefly summarized above, may be had by reference to the appended drawings.

It is to be noted, however, that the appended drawings illustrate only typical embodiments of this disclosure and are therefore not to be considered limiting of its scope, for the disclosure may admit to other equally effective embodiments.

DETAILED DESCRIPTION

Figure 1A:
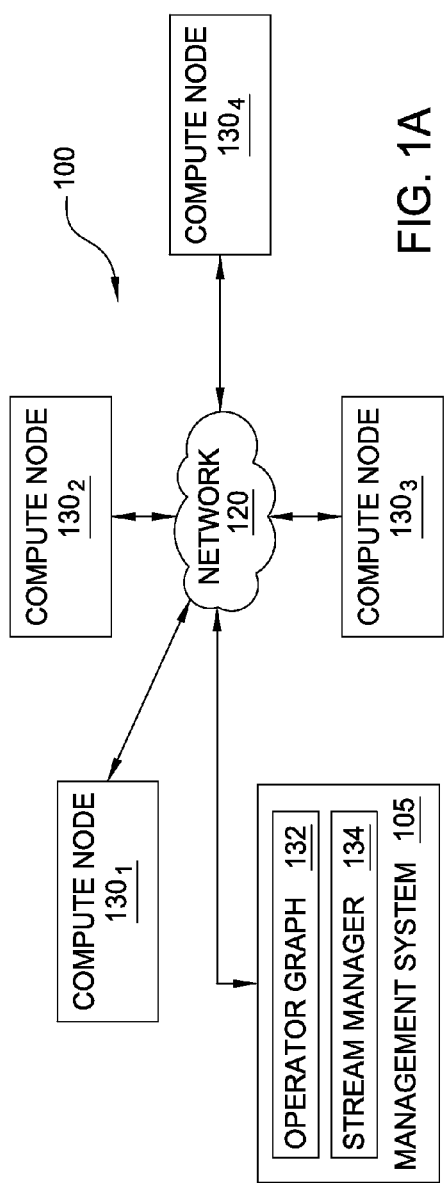
FIGS. 1A-1B illustrate a computing infrastructure configured to execute a streams computing application, according to embodiments disclosed herein.

Embodiments disclosed herein provide techniques for handling data in an out-of-order fashion in a predefined environment such as a streams programming environment. Environments, such as batch processing or queue processing, may handle data in the order in which the data arrives or in a predetermined sort order established by a queuing mechanism. In streams programming, data may often be processed in the order in which the data arrives. At least in some cases, streams programming may be better equipped—at least relative to other environments—to handle situations in which there is too much incoming data to process in a timely manner. Many computing systems simply cannot process all incoming data and certainly cannot process it in the order in which it arrives.

Accordingly, one embodiment provides an operation for handling data in an out-of-order fashion in a streams programming environment. The operation begins by providing multiple processing elements, each having one or more operators configured to process streaming data tuples. The operation then establishes an operator graph of multiple operators, the operator graph defining at least one execution path in which a first operator is configured to receive data tuples from at least one upstream operator and transmit data tuples to at least one downstream operator. The operation then defines a windowing condition specifying at least one rule for processing data tuples. The operation then, responsive to receiving, at a first operator an indication to enforce the windowing condition on the first operator, processes a first set of data tuples received by the first operator. The operation, while processing the first set of data tuples and upon determining that the windowing condition has been satisfied, ceases processing the first set of data tuples, where at least one data tuple of the first set of data tuples is not processed, and proceeds to process a second set of data tuples.

Disclosed are mechanisms that enable streams computing applications to handle data in an out-of-order fashion. In the context of streams applications, windowing conditions are used to process the data in an out-of-order fashion. The windowing conditions may be defined by the streaming data, but thought and care must be used when implementing the details of what is meant by processing data out of order. If a tuple is being processed one hour after the fact, it may be too late to do so in some applications. Likewise, processing data too far removed from its congruent data may also have similar negative connotations. Therefore, in a streams computing environment, the timeliness of processing out-of-order data may be defined by a windowing condition. The processing of data in an out-of-order manner may then be allowed when the situation presents itself.

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a streams computing application may be virtual machines hosted by a cloud service provider. Doing so allows a user to access this information from any computing system attached to a network connected to the cloud (e.g., the Internet).

Figure 1B:
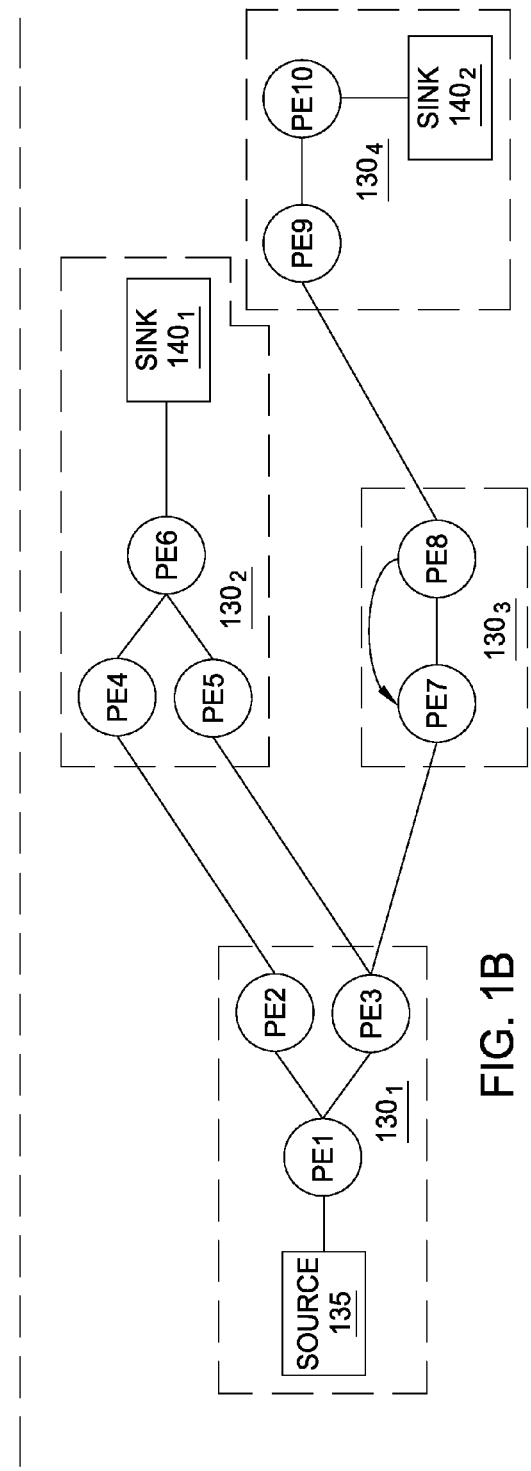

FIGS. 1A-1B illustrate a computing infrastructure configured to execute a streams computing application, according to one embodiment of the disclosure. As shown, the computing infrastructure 100 includes a management system 105 and a plurality of compute nodes $130_{1-4}$, each connected to a communications network 120. Also, the management system 105 includes an operator graph 132 and a stream manager 134. As described in greater detail below, the operator graph 132 represents a streams computing application beginning from one or more operators in one or more source processing elements (PEs) through to one or more operators in one or more sink PEs. This flow from source to sink is also generally referred to herein as an execution path. Generally, data attributes flow into an operator of a source PE of a streams computing application and are processed by that operator. Typically, operators receive an N-tuple of data attributes from the stream as well as emit an N-tuple of data attributes into the stream (except for operators in a sink PE where the stream terminates).

In general, a "tuple" is a single instance of a set of data attributes that follow the formatting of a schema, where the schema establishes a set of typed data attributes that may be used. For example, the tuple may be a chunk or portion of divisible data such as a data type (e.g., string, integer, Boolean, etc.) or combination of data types. In one embodiment, a "tuple" may include one or more attributes with an assigned value—e.g., Tuple 1: {sym="Fe", no=26} where "sym" and "no" are possible attributes in the schema (i.e., a string and integer, respectively) and "Fe" and "26" are the values.

Of course, the N-tuple received by an operator need not be the same N-tuple sent downstream. Additionally, operators could be configured to receive or emit tuples in other formats (e.g., the PEs or operators could exchange data marked up as XML documents). Furthermore, each operator within a PE may be configured to carry out any form of data processing functions on the received tuple, including, for example, writing to database tables or performing other database operations such as data joins, splits, reads, etc., as well as performing other data analytic functions or operations.

The stream manager 134 may be configured to monitor a streams computing application running on the compute nodes $130_{1-4}$, as well as to change the deployment of the operator graph 132. The stream manager 134 may move processing elements (PEs) from one compute node 130 to another, for example, to manage the processing loads of the compute nodes 130 in the computing infrastructure 100. Further, stream manager 134 may control the streams computing application by inserting, removing, fusing, un-fusing, or otherwise modifying the processing elements and operators (or what data tuples flow to the processing elements and operators) running on the compute nodes $130_{1-4}$. One example of a streams computing application is IBM®'s InfoSphere® Streams (InfoSphere® is a trademark of International Business Machines Corporation, registered in many jurisdictions worldwide).

FIG. 1B illustrates an example processing element graph that includes ten processing elements (labeled as PE1-PE10) running on the compute nodes $130_{1-4}$. A processing element is composed of one or more operators fused together into an independently running process with its own process ID (PID) and memory space. In cases where two (or more) processing elements are running independently, inter-process communication may occur using a "transport" (e.g., a network socket, a TCP/IP socket, or shared memory). However, when operators are fused together, the fused operators can use more rapid communication techniques for passing tuples among operators in each processing element.

As shown, the processing element graph begins at a source 135 (that flows into the processing element labeled PE1) and ends at sink $140_{1-2}$ (that flows from the processing elements labeled as PE6 and PE10). Compute node $130_1$ includes the processing elements PE1, PE2 and PE3. Source 135 flows into operators in the processing element PE1, which in turn emits tuples that are received by PE2 and PE3. For example, operators in PE1 may split data attributes received in a tuple and pass some data attributes to PE2, while passing other data attributes to PE3. Data that flows to PE2 is processed by the operators contained in PE2, and the resulting tuples are then emitted to the operators in PE4 on compute node $130_2$. Likewise, the data tuples emitted by the operators in PE4 flow to the operators sink PE6 $140_1$. Similarly, data tuples flowing from operators in PE3 to operators in PE5 also reach operators in sink PE6 $140_1$. Thus, in addition to being a sink for this example processing element graph, operators in PE6 could be configured to perform a join operation, combining tuples received from operators in PE4 and PE5. This example processing element graph also shows data tuples flowing from PE3 to PE7 on compute node $130_3$, which itself shows data tuples flowing to operators in PE8 and looping back to operators in PE7. Data tuples emitted from operators in PE8 flow to operators in PE9 on compute node $130_4$, which in turn emits tuples to be processed by operators in sink PE10 $140_2$. Once processed by operators in a sink processing element, for example PE10 $140_2$, data tuples may be saved in a file sink (not pictured) for storage. The file sink may be any storage unit capable of storing data.

Because a processing element is a collection of fused operators, it is equally correct to describe the operator graph as execution paths between specific operators, which may include execution paths to different operators within the same processing element. FIG. 1B illustrates execution paths between processing elements for the sake of clarity.

In one embodiment, the stream manger 134 may be able to communicate with other operator graphs executing in a streams computing application. That is, the compute nodes 130 may host operator graphs executing in parallel. The stream manager 134 may be able to communicate with a stream manager associated with those parallel operator graphs using, for example, a shared memory where messages and commands may be passed. Alternatively, stream manager 134 may be part of a hierarchical arrangement of stream managers that allow the different stream managers to communicate. The stream manager 134 may use the manager hierarchy or the shared memory to instruct a different stream manager to optimize an operator graph in the streams computing application that is sharing the same compute nodes 130 (i.e., hardware resources) as the operator graph shown in FIG. 1B. Additionally, the hierarchical arrangement may manage stream managers across different compute nodes, for example, a first stream manager 134 for a first streams computing application owned by a first customer and a second stream manager 134 for a second streams computing application owned by a second customer.

Figure 2:
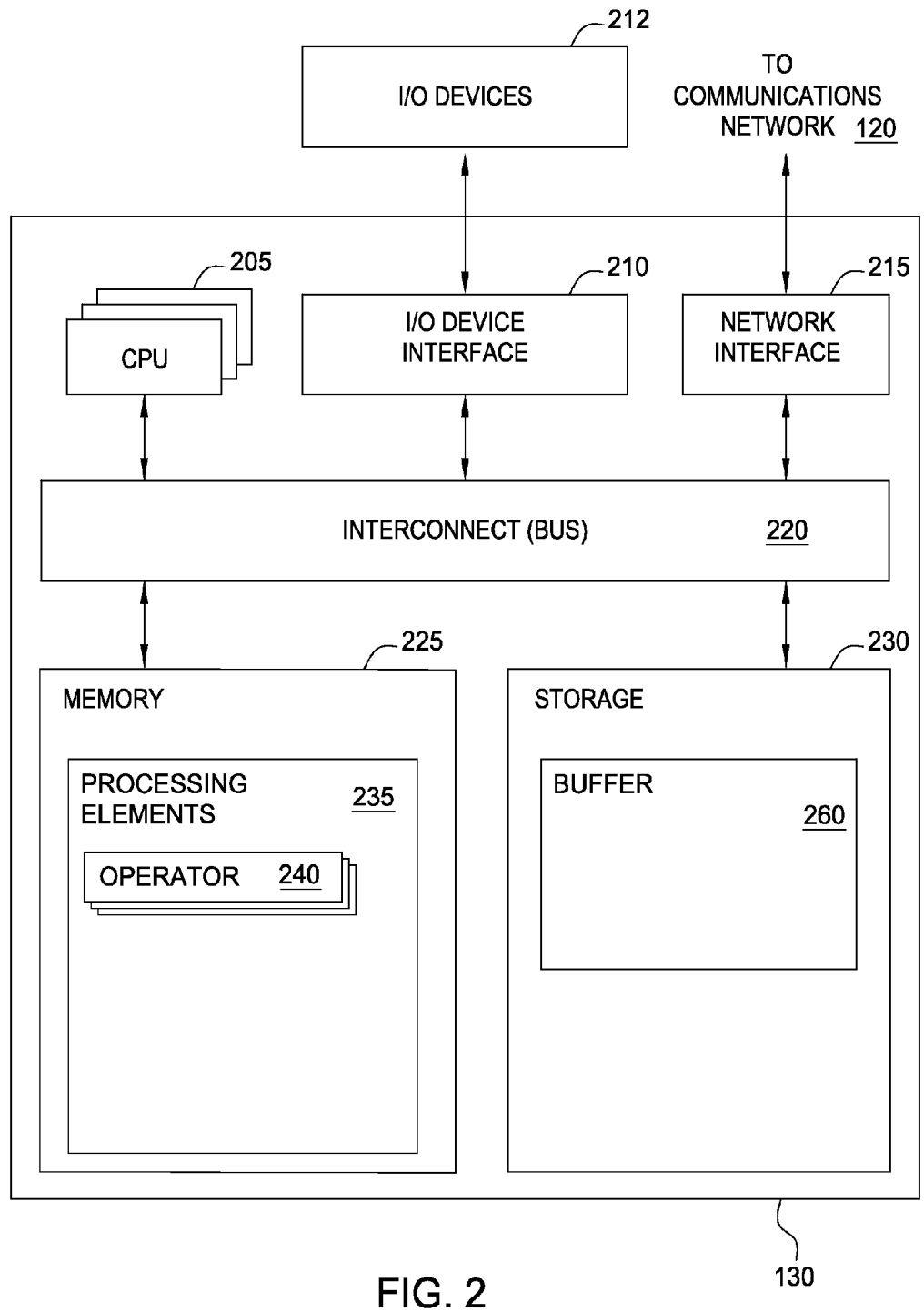
FIG. 2 is a more detailed view of the compute node of FIGS. 1A-1B, according to one embodiment disclosed herein.

FIG. 2 is a more detailed view of the compute node 130 of FIGS. 1A-1B, according to one embodiment disclosed herein. As shown, the compute node 130 includes, without limitation, at least one CPU 205, a network interface 215, an interconnect 220, a memory 225, and storage 230. The compute node 130 may also include an I/O devices interface 210 used to connect I/O devices 212 (e.g., keyboard, display and mouse devices) to the compute node 130.

Each CPU 205 retrieves and executes programming instructions stored in the memory 225. Similarly, the CPU 205 stores and retrieves application data residing in the memory 225. The interconnect 220 is used to transmit programming instructions and application data between each CPU 205, I/O devices interface 210, storage 230, network interface 215, and memory 225. CPU 205 is included to be representative of a single CPU, multiple CPUs, a single CPU having multiple processing cores, and the like. In one embodiment, a PE 235 is assigned to be executed by only one CPU 205 although in other embodiments the operators 240 of a PE 235 may comprise one or more threads that are executed on a plurality of CPUs 205. The memory 225 is generally included to be representative of a random access memory (e.g., DRAM or Flash). Storage 230, such as a hard disk drive, solid state device (SSD), or flash memory storage drive, may store non-volatile data.

In this example, the memory 225 includes a plurality of processing elements 235. Each PE 235 includes a collection of operators 240 that are fused together. As noted above, each operator 240 may provide a small chunk of code configured to process data flowing into a processing element (e.g., PE 235) and to emit data to other operators 240 in the same PE or to other PEs in the streams computing application. Such processing elements may be on the same compute node 130 or on other compute nodes that are accessible via communications network 120.

As shown, storage 230 contains a buffer 260. Although shown as being in storage, the buffer 260 may be located in the memory 225 of the compute node 130 or a combination of both. Moreover, storage 230 may include storage space that is external to the compute node 130.

Figure 3:
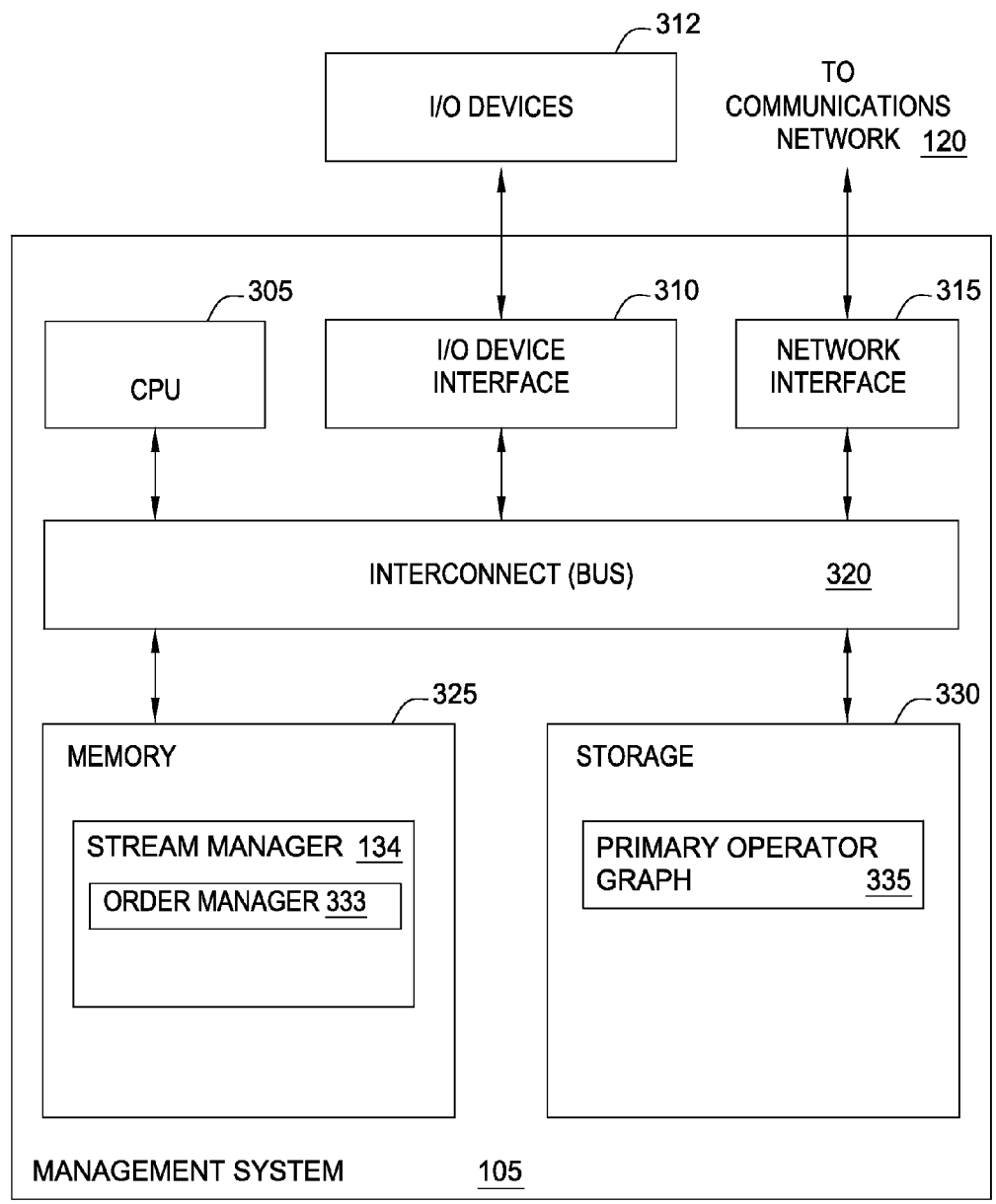
FIG. 3 is a more detailed view of the server management system of FIGS. 1A-1B, according to one embodiment disclosed herein.

FIG. 3 is a more detailed view of the server management system 105 of FIG. 1, according to one embodiment disclosed herein. As shown, server management system 105 includes, without limitation, a CPU 305, a network interface 315, an interconnect 320, a memory 325, and storage 330. The client system 130 may also include an I/O device interface 310 connecting I/O devices 312 (e.g., keyboard, display and mouse devices) to the server management system 105.

Like CPU 205 of FIG. 2, CPU 305 is configured to retrieve and execute programming instructions stored in the memory 325 and storage 330. Similarly, the CPU 305 is configured to store and retrieve application data residing in the memory 325 and storage 330. The interconnect 320 is configured to move data, such as programming instructions and application data, between the CPU 305, I/O devices interface 310, storage unit 330, network interface 305, and memory 325. Like CPU 205, CPU 305 is included to be representative of a single CPU, multiple CPUs, a single CPU having multiple processing cores, and the like. Memory 325 is generally included to be representative of a random access memory. The network interface 315 is configured to transmit data via the communications network 120. Although shown as a single unit, the storage 330 may be a combination of fixed and/or removable storage devices, such as fixed disc drives, removable memory cards, optical storage, SSD or flash memory devices, network attached storage (NAS), or connections to storage area-network (SAN) devices.

As shown, the memory 325 stores a stream manager 134. Additionally, the storage 330 includes a primary operator graph 132. The stream manager 134 may use the primary operator graph 132 to route tuples to PEs 235 for processing. The stream manager 134 also includes an order manager 333, which is configured to monitor and reconfigure the order in which data tuples are processed in an operator. The order manager 333 may define streams-like window conditions such that when data flows through the operator graph 132, the tuples are processed within context of each other. The contexts may be defined by a time relationship, a tuple count relationship, and/or an attribute value relationship. For example, the order manager 333 may impose a condition that data tuples must be processed within two minutes of their related data tuples or within fifty tuples of their related data tuples. Additionally, an attribute value, such as a product price, may be monitored by the buffer manager 333 to detect a fluctuation in the price that exceeds a specified threshold. Once the condition is triggered, the order manager 333 may cause the operator to cease processing of unprocessed tuples meeting the condition. The order manager 333 may serve to impose a windowing condition on an operator which does not support windowing by default, in order to implement the ordered processing rules disclosed herein.

At least in some embodiments, streams computing applications may provide at least two types of windows, including tumbling windows and sliding windows. An operator may not necessarily support windows by default. Both tumbling and sliding windows store tuples preserving the order of arrival at the operator but differ in how they handle tuple evictions. Rather than keeping all tuples ever inserted, windows are configured to evict expired tuples. In this respect, tumbling windows operate in batches; when a tumbling window is full, all the tuples in the window are evicted. This is called a window flush. After a tumbling window has been flushed, the window is not triggered until the buffer 260 contains the requisite number of tuples or a predefined period of time has elapsed. On the other hand, sliding windows operate in an incremental fashion. When a sliding window is full, future tuple insertions generally result in evicting the oldest tuples in the window. Triggering a new sliding window may occur as a new tuple is received or when a predefined period of time has elapsed. The details of tuple eviction in a sliding window are defined by the eviction policy. In both a tumbling and sliding window, the windowing policy defines a trigger policy based on a predefined number of received tuples or the expiration of a predefined period of time.

Figure 4:
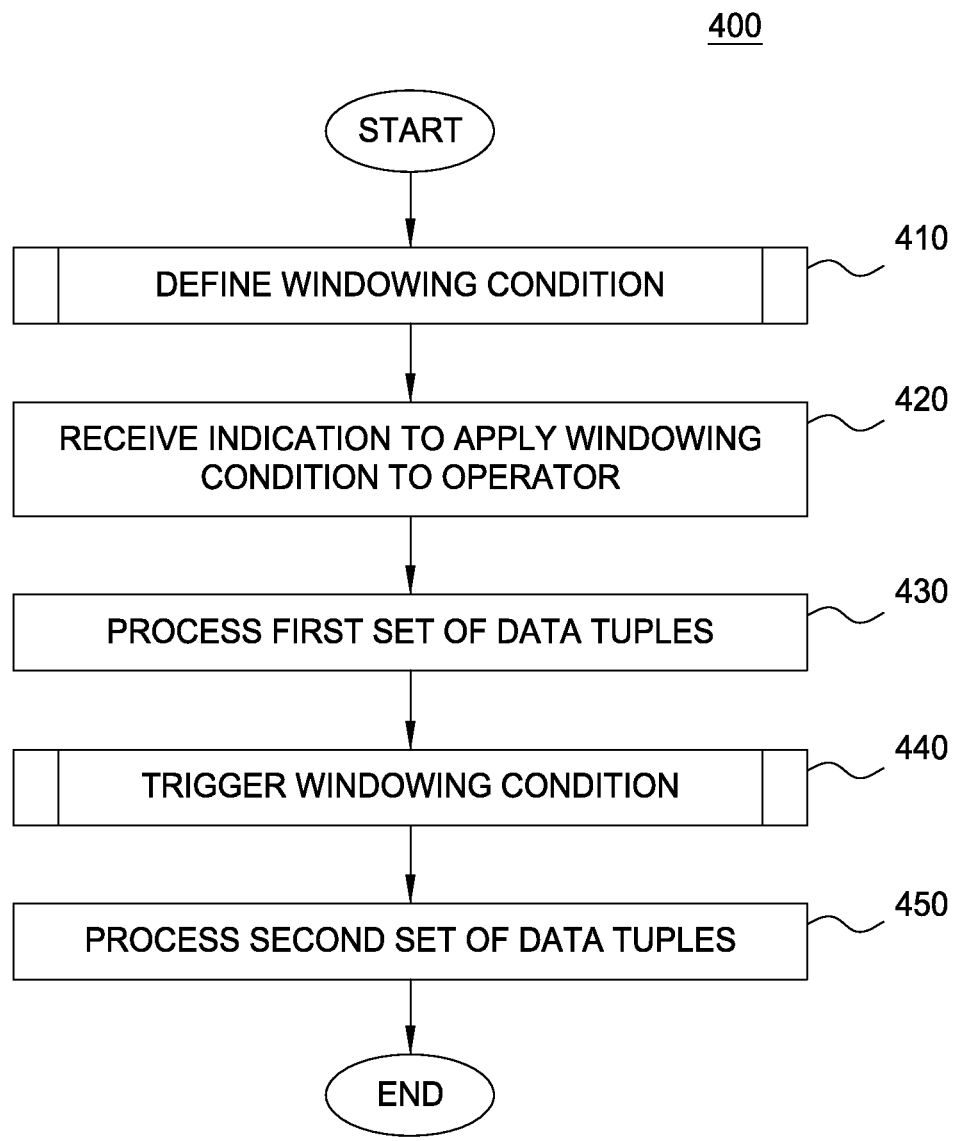
FIG. 4 is a flowchart illustrating a method to handle out-of-sequence data in a streams computing environment, according to one embodiment disclosed herein.

FIG. 4 is a flowchart illustrating a method 400 to handle out-of-sequence data in a streams computing environment, according to one embodiment disclosed herein. Generally, the steps of the method 400 may define windowing conditions for the ordered (and unordered) processing of data tuples. At step 410, which is further described in greater detail below in conjunction with FIG. 5, a windowing condition is defined. The windowing condition allows a programmer to define contextual constraints within which data tuples must be processed. If the constraints are not met, subsequent processing may be deemed untimely and unnecessary, and unprocessed data tuples not meeting these constraints may not be processed, in order to reduce the overall processing load of an operator (and of the operator graph as a whole). The windowing conditions may be defined as part of the properties of each operator in the operator graph and enforced at compilation/runtime. At step 420, an operator of the operator graph may receive an indication to begin applying the windowing conditions in its processing operations. In one embodiment, the indication is an out-of-band signal coming to the operator which triggers the application of the windowing conditions. The out-of-band signal may be sent by the order manager 333. In another embodiment, a tuple arriving at an operator may trigger the application of the windowing conditions at the operator, i.e., all data tuples processed by the operator may be subject to the windowing conditions.

At step 430, the operator may process a first set of data tuples. The first set of data tuples may include any number of data tuples sequentially received at the operator. In one embodiment, the first set of tuples includes a window of tuples. The operator may process the data tuples of the first set one at a time, in the order in which they are received. However, the operator may not be able to process each data tuple of the first set within the constraints imposed by the windowing condition. For example, the windowing condition may specify a two-minute window within which data tuples of the first set are to be processed. If the operator is unable to process all tuples received within the two-minute window, the windowing condition is triggered (step 440). In one embodiment, the windowing condition may be triggered by the order manager 333. Triggering the windowing condition is further described in greater detail below in conjunction with FIG. 5. In one embodiment, triggering the windowing condition may include ceasing the processing of data tuples of the first data set—i.e., refraining from processing any heretofore unprocessed data tuples. At step 450, the operator may begin processing a second set of data tuples after the windowing condition has been triggered. In one embodiment, the second set of data tuples may be a second window of data tuples. The second set of data tuples may be distinct from the first set of data tuples, as is the case for tumbling windows, or alternatively, the first and second set of data tuples may contain at least one duplicate data tuple, as in the case for sliding windows.

Figure 5:
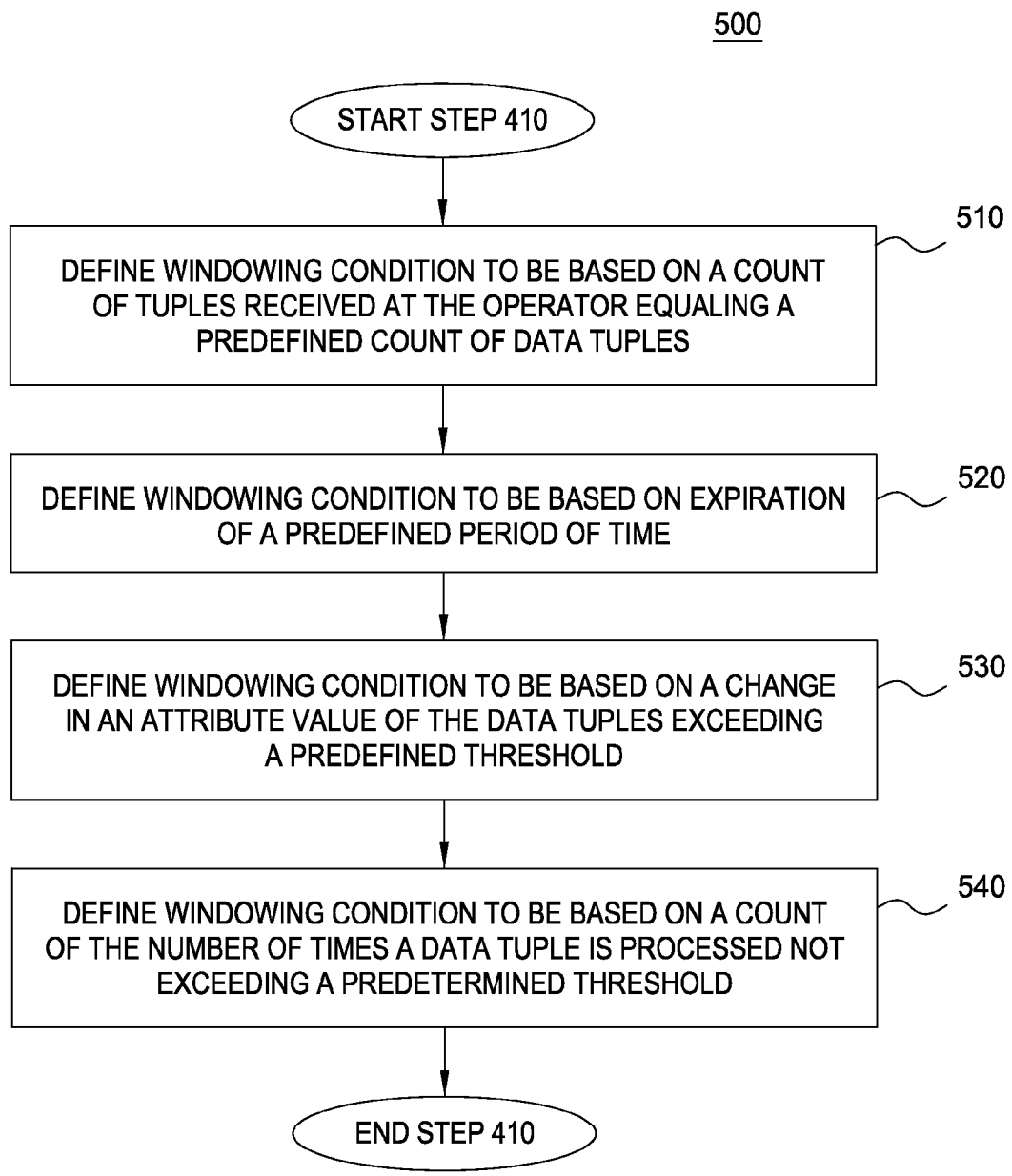
FIG. 5 is a flowchart illustrating a method to define a windowing condition to handle out-of-sequence data in a streams computing environment, according to one embodiment disclosed herein.

FIG. 5 is a flowchart illustrating a method 500 corresponding to step 410 to define a windowing condition to handle out-of-sequence data in a streams computing environment, according to one embodiment disclosed herein. A windowing condition may be defined in any number of ways. For example, a streams computing programmer may define a specific windowing condition. Additionally, the order manager 333 may provide a predefined set of windowing conditions. Although depicted as a flowchart, one, several, or all of the steps of the method 500 may be used to define windowing conditions. Generally, once a windowing condition is triggered, the order manager 333 may take any number of actions, including refraining from processing the unprocessed tuples at the operator. At step 510, a windowing condition is defined to be based on a count of tuples received at the operator equaling a predefined count of data tuples. For example, the windowing condition may specify that data tuples are to be processed within forty data tuples of each other. If a data tuple in the first set of forty tuples is not processed by the time the fortieth data tuple is received at the operator, the windowing condition may be triggered by the order manager 333.

At step 520, a windowing condition is defined to be based on the expiration of a predefined period of time. In this context, tuples are to be processed within the predefined period of time. A programmer or the order manager 333 may specify the predefined period of time. For example, the predefined period of time may be two minutes. Once the windowing condition is applied and a first tuple of a first set of tuples is received, the buffer manager 333 may start a two-minute timer. All tuples received within that two-minute time period should therefore be processed by the operator; otherwise, the windowing condition will be triggered. For example, if two hundred tuples are received in two minutes, yet only fifty tuples are processed, then the windowing condition may be triggered.

At step 530, a windowing condition may be defined to be based on a change in an attribute value of the data tuples, where the change exceeds a predefined threshold. Depending on the embodiment, a programmer or the order manager 333 may specify the predefined threshold. For example, the windowing condition may specify that the order manager 333 monitor a price attribute of products being sold by an online ordering application. The condition may specify that if the price attribute of data tuples fluctuates by more than the predefined threshold, for example, two cents, the condition should be triggered. Therefore, once the order manager 333 detects a price attribute exceeding the two-cent threshold, the windowing condition may be triggered.

At step 540, a windowing condition may be defined to be based on a count of times a data tuple is processed, where the count does not exceed a predefined threshold. As described above, a sliding window operates in an incremental fashion. When one tuple is processed, the processed tuple is evicted from the window, and a new tuple enters the window. This may result in the processing of a single tuple numerous times, as the tuple may appear in multiple windows. Therefore, a programmer, or the buffer manager 333 may specify a predefined threshold which indicates the maximum number of times a data tuple may be processed. Thus, the buffer manager 333 may monitor the number of times a data tuple is processed by an operator. If the count of times the data tuple is processed equals the threshold, the data tuple may continue to remain in future windows until it is evicted, but will not be processed again by that operator. For example, if the threshold specifies that a data tuple cannot be processed more than four times, once the tuple has been four times (i.e., as a member of four different sliding windows), it will not be processed again, regardless of the number of subsequent windows in which it is a member.

Figure 6:
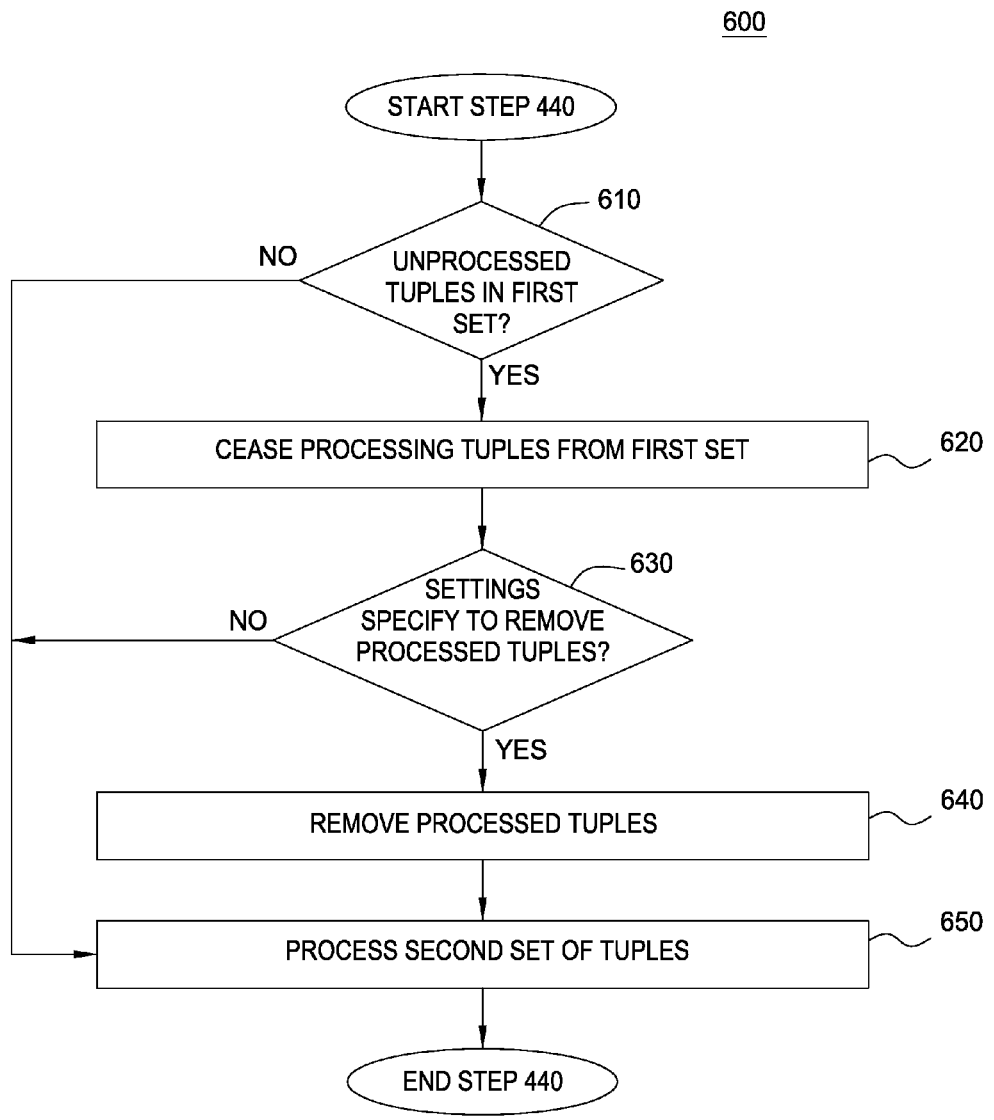
FIG. 6 is a flowchart illustrating a method to trigger a windowing condition to handle out-of-sequence data in a streams computing environment, according to one embodiment disclosed herein.

FIG. 6 is a flowchart illustrating a method 600 corresponding to step 440 to trigger a windowing condition to handle out-of-sequence data in a streams computing environment, according to one embodiment disclosed herein. In one embodiment, the order manager 333 performs the steps of the method 600. Generally, the method 600 is triggered while an operator is processing a first set of data tuples subject to the windowing condition imposed on the operator at step 420 and the windowing condition is met. For example, if the windowing condition specifies that all data tuples must be processed within a two-minute time frame of each other, and two minutes have elapsed since a first data tuple of a first set has been received, the windowing condition may be triggered. At step 610, the order manager 333 may determine whether unprocessed data tuples remain in the first set, i.e., those data tuples received within the two minute time frame. For example, in the first two minutes, five hundred tuples may have been received, yet only four hundred were processed. If unprocessed tuples remain, the method proceeds to step 620. If all tuples were processed, the method proceeds to step 650. At step 620, the order manager 333 may provide an indication to the operator to cease processing the unprocessed tuples from the first set. Alternatively, the operator may be pre-programmed to cease processing the tuples without an instruction from the order manager 333. By implementing this logic, the order manager 333 may ensure or improve a likelihood that all data tuples are processed in a timely manner, as specified by the windowing conditions. In ceasing the processing of the unprocessed data tuples, the order manager 333 may specify that the unprocessed tuples may be discarded from the operator graph.

At step 630, the buffer manager 333, or the operator itself, may determine whether the operator properties specify that tuples processed prior to the triggering of the windowing condition should be removed from the operator graph (or from a file sink containing fully processed data tuples). If the settings specify to remove processed data tuples, the method proceeds to step 640. Otherwise, the data method proceeds to step 650, and the processed tuples continue to flow through the operator graph. At step 640, the processed tuples are removed from the operator graph or the file sink. In one embodiment, data tuples are marked by a unique identifier which allows subsequent operators to identify and remove the data tuples, based on a signal indicating that tuples having specified identifiers should be removed. The tuples may be removed from the current operator, or a downstream operator which received the processed data tuples from the current operator. For example, operator A may process tuples and send them to operator B, which may process the tuples and sends them to operator C. The tuples, upon triggering of the windowing condition, may be removed from any of operator A, B, or C, depending on their location. At step 650, the operator begins processing a second set of data tuples. Once the operator begins processing the second set of data tuples, the steps of the method 400 may begin anew, such that the buffer manager 333 ensures or improves the timely processing of data tuples in the operator.

Figure 7:
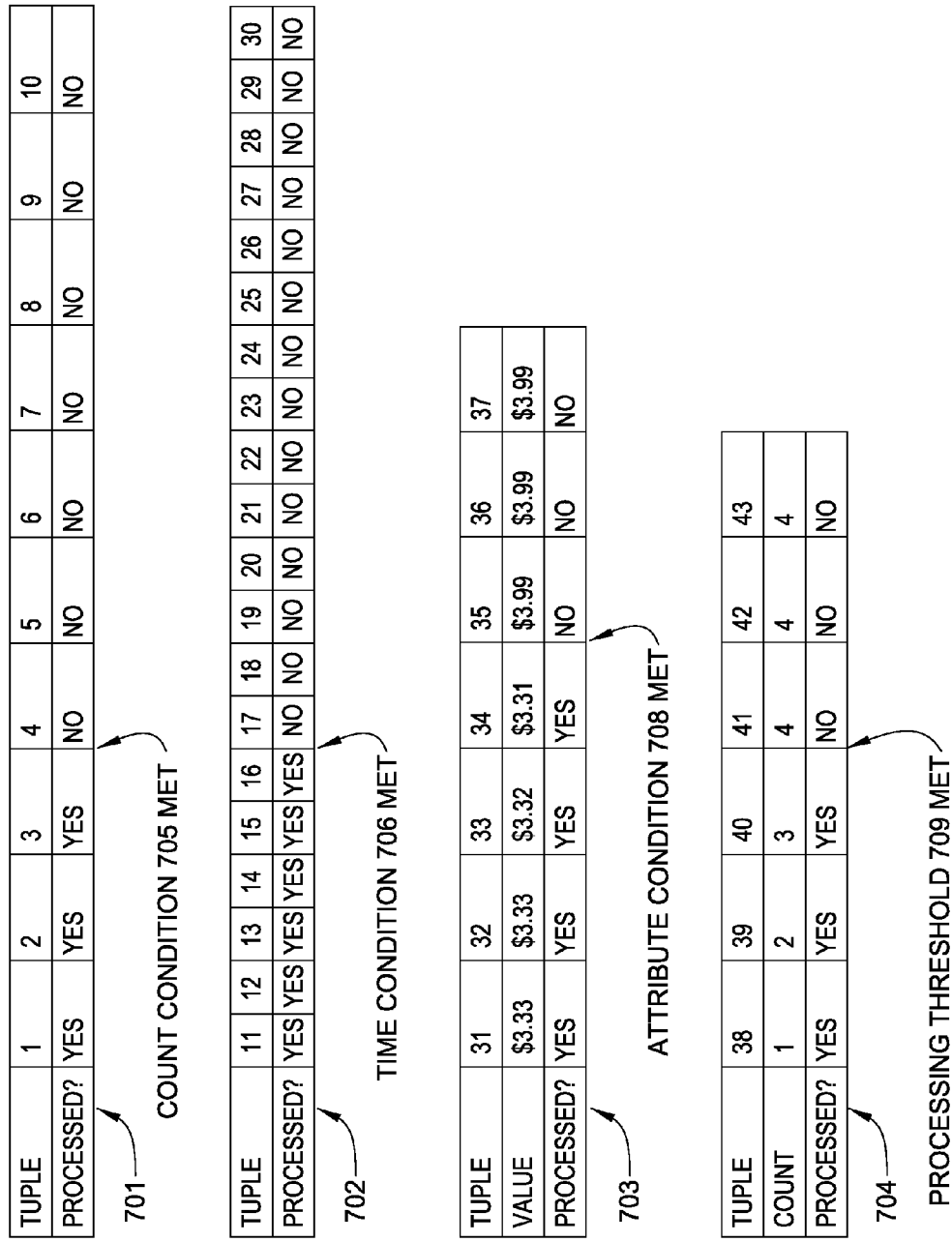
FIG. 7 is a schematic illustrating techniques for handling out-of-sequence data in a streams computing environment, according to one embodiment disclosed herein.

FIG. 7 is a schematic 700 illustrating techniques for handling out-of-sequence data in a streams computing environment, according to one embodiment disclosed herein. Generally, the schematic 700 includes tables 701-704, each showing the application of a different windowing condition. For example, table 701 shows a count condition 705 where, once ten tuples are received, all tuples must be processed, or the windowing condition is triggered. Table 701 shows tuples 1-10, however, when the count condition 705 is met, only tuples 1-3 have been processed. Stated differently, the operator begins processing the data tuples as they are received, but has only completed processing 3 tuples when the tenth tuple arrives. Because the tuples 4-10 have not been processed, the windowing condition is triggered, and the tuples 4-10 may not be processed. Furthermore, the tuples 1-3 (as well as 4-10) may be removed from the operator graph. A new window of tuples may then be received by the operator, and the processing may resume according to the windowing condition restrictions.

Table 702 shows a time condition 706, which, for example, may specify that data tuples must be processed within five minutes of each other, according to one embodiment. The operator begins processing tuples as they are received. However, when five minutes have elapsed and the time condition 706 is met, tuples 11-30 have been received, yet only tuples 11-16 have been processed. Tuples 17-30, received within the five-minute time frame, stand unprocessed and may hence remain unprocessed in favor of processing a new window of data tuples. Furthermore, the tuples 11-30 may be removed from the operator graph.

Table 703 shows an attribute condition 708, which may specify that the price attribute of a tuple cannot exceed two cents, according to one embodiment. As shown, the first tuple 31 has a value of $3.33, and tuples 32-34 are within two cents of this price. Once the condition 708 is met, when tuples 35-37 arrive having a price attribute value of $3.99, the condition is met, and tuples 35-37 may not be processed. Furthermore, the tuples 31-34 and 35-37 may be removed from the operator graph. A new window of tuples may then be received by the operator, and the processing may resume according to the windowing condition restrictions.

Table 704 shows a processing count threshold 709, which may specify that tuples of a sliding window cannot be processed more than four times, according to one embodiment. As shown, tuples 38-39 have been processed fewer than four times, so they may be processed another time, as part of a new sliding window. However, tuples 41-43 have been processed four times each and will not be processed again, even though they may remain as members of subsequent windows.

Advantageously, embodiments disclosed herein allow for faster processing of data due to optimizations that can be made when the data need no longer be processed in a pre-defined order. In one embodiment, a programming environment may be defined where a programmer can handle data in a timely manner—e.g., incoming data tuples may be handled in a relationship of time, or a count of tuples to other nearby tuples in which they arrive. A condition may be defined specifying that data tuples should be processed within x seconds of each other or within y tuples of each other. Streams windowing may be specified such that a tuple can or cannot be processed if other tuples of nearby relevance still exist in the window. Doing so allows for scenarios beyond time-based or count-based processing of data and also introduces and/or accommodates both tumbling and sliding windowing scenarios. Moreover, doing so provides an environment in which the streams computing application may identify conditions that allow the application to eliminate certain processing.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A computer program product, comprising:
 a non-transitory computer-readable storage medium having computer-readable program code embodied therewith, the computer-readable program code comprising:
  computer-readable program code configured to provide a plurality of processing elements comprising one or more operators, the operators configured to process streaming data tuples by operation of one or more computer processors;
  computer-readable program code configured to establish an operator graph of a plurality of operators, the operator graph defining at least one execution path in which a first operator of the plurality of operators is configured to: (i) receive data tuples from at least one upstream operator and (ii) transmit data tuples to at least one downstream operator;
  computer-readable program code configured to define a windowing condition specifying at least one rule for processing data tuples, wherein the at least one rule is based on one of: (i) a count of data tuples received by the first operator equaling a predefined count, (ii) expiration of a predefined period of time, and (iii) a change in an attribute value of the data tuples exceeding a predefined threshold; and computer-readable program code configured to, responsive to receiving, at a first operator of the plurality of operators, an indication to enforce the windowing condition on the first operator:

process a first set of data tuples received by the first operator; and while processing the first set of data tuples, upon determining that the windowing condition has been satisfied:

cease the processing of the first set of data tuples, wherein at least one data tuple of the first set of data tuples is not processed; and process a second set of data tuples.

2. A system, comprising:

one or more computer processors; and a memory containing a program, which when executed by the one or more computer processors is configured to perform an operation comprising:

providing a plurality of processing elements comprising one or more operators, the operators configured to process streaming data tuples;

establishing an operator graph of a plurality of operators, the operator graph defining at least one execution path in which a first operator of the plurality of operators is configured to: (i) receive data tuples from at least one upstream operator and (ii) transmit data tuples to at least one downstream operator;

defining a windowing condition specifying that a count of times a data tuple is processed cannot exceed a predetermined threshold; and responsive to receiving, at a first operator of the plurality of operators, an indication to enforce the windowing condition on the first operator:

processing a first set of data tuples received by the first operator; and while processing the first set of data tuples, upon determining that the windowing condition has been satisfied for a first data tuple, of the first set of data tuples, refraining from processing the first data tuple.

3. A computer program product, comprising:

a computer-readable storage medium having computer-readable program code embodied therewith, the computer-readable program code comprising:

computer-readable program code configured to provide a plurality of processing elements comprising one or more operators, the operators configured to process streaming data tuples by operation of one or more computer processors;

computer-readable program code configured to establish an operator graph of a plurality of operators, the operator graph defining at least one execution path in which a first operator of the plurality of operators is configured to: (i) receive data tuples from at least one upstream operator and (ii) transmit data tuples to at least one downstream operator;

computer-readable program code configured to define a windowing condition specifying that a count of times a data tuple is processed cannot exceed a predetermined threshold; and computer-readable program code configured to, responsive to receiving, at a first operator of the plurality of operators, an indication to enforce the windowing condition on the first operator:

process a first set of data tuples including a first data tuple received by the first operator; and while processing the first set of data tuples, upon determining that the windowing condition has been satisfied for the first data tuple, refraining from processing the first data tuple.

4. The computer program product of claim 1, wherein the computer-readable program code further comprises:

removing, from at least one of: (i) the first operator, and (ii) the at least one downstream operator, data tuples of the first set of data tuples processed by the first operator.

5. The computer program product of claim 1, wherein the computer-readable program code further comprises:

removing, from a data sink configured to store data tuples that are fully processed by the operator graph, data tuples of the first set of data tuples processed by the first operator.

6. The computer program product of claim 1, wherein the windowing condition specifies that a count of times a data tuple is processed cannot exceed a predetermined threshold, wherein the computer-readable program code further comprises:

upon determining the windowing condition has been satisfied:

upon determining a first data tuple is a member of the second set of data tuples, refraining from processing the first data tuple.

7. The computer program product of claim 1, wherein the computer-readable program code configured to receive the indication comprises one of:

(i) computer-readable program code configured to receive an out-of-band signal; and (ii) computer-readable program code configured to receive, at the first operator, a first data tuple.

8. The computer program product of claim 1, wherein the first operator does not have a window, wherein the window comprises a plurality of data tuples in an operator.

9. The system of claim 2, the operation further comprising:

removing, from at least one of: (i) the first operator, and (ii) the at least one downstream operator, data tuples of the first set of data tuples processed by the first operator.

10. The system of claim 2, the operation further comprising:

removing, from a data sink configured to store data tuples that are fully processed by the operator graph, data tuples of the first set of data tuples processed by the first operator.

11. The system of claim 2, wherein the windowing condition further specifies at least one of: (i) processing the data tuple cannot exceed a predefined period of time, and (iii) a change in an attribute value the data tuple cannot exceed a predefined threshold.

12. The system of claim 2, wherein receiving the indication comprises one of: (i) receiving an out-of-band signal and (ii) receiving, at the first operator, a first data tuple.

13. The system of claim 2, wherein the first operator does not have a window, wherein the window comprises a plurality of data tuples in an operator.

* * * * *